United States Patent [19]

Hitomi

[11] Patent Number: 5,678,780

[45] Date of Patent: Oct. 21, 1997

[54] SPINNING REEL RECIPROCATION MECHANISM

[75] Inventor: Yasuhiro Hitomi, Hashimoto, Japan

[73] Assignee: Shimano Inc., Osaka, Japan

[21] Appl. No.: 524,756

[22] Filed: Sep. 7, 1995

[30] Foreign Application Priority Data

Sep. 13, 1994 [JP] Japan .................. 6-2191204

[51] Int. Cl.⁶ .................................. A01K 89/01
[52] U.S. Cl. .................................. 242/241
[58] Field of Search ..................... 242/241, 242

[56] References Cited

U.S. PATENT DOCUMENTS

| | | | |
|---|---|---|---|
| 4,427,162 | 1/1984 | Noda | 242/241 |
| 4,512,531 | 4/1985 | Tunoda | 242/241 |
| 4,773,611 | 9/1988 | Kaneko | 242/241 |
| 4,865,262 | 9/1989 | Tsunoda | 242/241 |
| 5,232,181 | 8/1993 | Fujine | 242/241 |
| 5,308,017 | 5/1994 | Yoshikawa | 242/241 |
| 5,316,239 | 5/1994 | Sugawara | 242/241 |
| 5,350,130 | 9/1994 | Hitomi et al. | 242/241 |

FOREIGN PATENT DOCUMENTS

| | | |
|---|---|---|
| 617447 | 4/1962 | Canada ................ 242/241 |
| 2259435 | 3/1993 | United Kingdom . |
| 2261354 | 5/1993 | United Kingdom . |

*Primary Examiner*—Katherine Matecki
*Attorney, Agent, or Firm*—Jeffer, Mangels, Butler & Marmaro LLP

[57] ABSTRACT

A spinning reel reciprocation mechanism includes a freely rotatable screw shaft which has an outer circumference in which a plurality of helical grooves are formed, a pinion gear which has a rotational speed ratio of at least 1.5 relative to the screw shaft, a slider which has an engaging member that engages with the helical grooves. The slider is adapted to perform reciprocating motion in response to rotation of the screw shaft.

11 Claims, 6 Drawing Sheets

SPINNING REEL RECIPROCATION MECHANISM

FIELD OF THE INVENTION

The present invention relates to a reciprocation mechanism, and specifically concerns a reciprocation mechanism for a spinning reel which is installed on a spinning reel, and which is used to cause the reciprocating motion of a spool accompanying a handle rotating device. Furthermore, the present invention also concerns a spinning reel which has the reciprocation mechanism described above.

BACKGROUND OF THE INVENTION

Spinning reels generally have a reel main body, a rotor which is supported on the reel main body so that the rotor is free to rotate, and a spool around whose outer circumference a fishing line is wound. The rotor has a pair of arms, and a bail which can be freely opened and closed between a line releasing position and a line retrieving position is installed between the aforementioned arms. Furthermore, a line roller which guides the fishing line onto the outer circumference of the spool when the line is taken up is installed on the tip of one of the aforementioned arms.

In such a spinning reel, a level winding mechanism is provided in order to insure that the fishing line guided by the bail and line roller is uniformly wound in the forward-backward direction around the outer circumference of the spool. This level winding mechanism has a screw shaft which is installed parallel to the spool shaft to which the spool is fastened, a gear mechanism which is used to cause rotation of said screw shaft, and a slider which slides over the screw shaft. Helical grooves is formed in the outer circumference of the screw shaft, and a portion of the slider is engaged with these grooves. Furthermore, the slider is fastened to the rear end of the spool shaft, so that when the slider performs a reciprocating motion along the screw shaft, the spool shaft and spool also perform a similar reciprocating motion. Thus, since the spool is caused to perform a reciprocating motion accompanying the rotational operation of the handle, the fishing line is uniformly wound around the outer circumference of the spool.

In a conventional level winding mechanism, the screw shaft completes 3.5 to 3.8 revolutions for each revolution of the handle; accordingly, the speed of the reciprocating motion of the spool is relatively fast. As a result, the fishing line is sparsely wound around the spool in the forward-backward direction, so that efficient winding of the fishing line is difficult. Consequently, the length of fishing line that can be wound around the spool is shortened.

One conceivable approach to the solution of this problem is to reduce the helix angle of the grooves in the screw shaft (the angle between the grooves and a line perpendicular to the axial line), i.e., to reduce the helical pitch of the helical grooves, so that the speed of movement of the spool is reduced. However, when the helical pitch of the grooves in the screw shaft is reduced, the number of intersections of the grooves in the screw shaft is increased. As a result, the number of times that the aforementioned portion of the slider (i.e., a cross gear pin which acts as an engaging member) contacts the aforementioned intersections is increased. Since vibration is generated when the cross gear pin contacts the intersections of the grooves, the following problem arises: i.e., the feeling during rotation of the handle is poor.

One object of the present invention is to make it possible to achieve efficient winding of the fishing line on the spool in a spinning reel.

Another object of the present invention is to make it possible to achieve efficient winding of the fishing line on the spool in a fishing reel without causing any deterioration in the feeling of rotation during the rotation of the handle.

Still another object of the present invention is to make it possible to achieve efficient winding of the fishing line on the spool in a fishing reel without increasing the size of the reel main body.

SUMMARY OF THE PREFERRED EMBODIMENTS

In accordance with one aspect of the present invention, there is provided an improved reciprocation mechanism for a spinning reel. The mechanism is adapted to be installed in a spinning reel that has a rotor which is caused to rotate by the rotational operation of a handle, a spool around whose outer circumference a fishing line guided by the rotation of the aforementioned rotor is wound, and a spool shaft which is affixed to the central portion of the spool. The mechanism is used to cause a reciprocating motion of the spool accompanying the rotational operation of the handle.

The inventive mechanism is equipped with a screw shaft, a pinion gear and a slider. The screw shaft is a freely rotatable shaft, which is disposed along the spool shaft, and which has helical grooves formed in its outer circumference. The pinion gear is linked to the rotor and is provided for the purpose of transmitting the rotational force of the aforementioned handle to the screw shaft. This pinion gear has a rotational speed ratio of 1.5 or greater relative to the screw shaft. The slider has an engaging part that engages with the helical grooves. The slider is affixed to the spool shaft, and is adapted for reciprocating motion along the spool shaft by the rotation of the screw shaft.

When the handle is rotated, the resulting rotation force is transmitted to the screw shaft via the pinion gear. When the screw shaft rotates, the slider engaged with the helical grooves formed in the outer circumference of the screw shaft performs a reciprocating motion in the axial direction along the screw shaft. The slider is fastened to the spool shaft. Accordingly, when the slider performs a reciprocating motion, the spool shaft and spool also perform a similar reciprocating motion in the axial direction. As a result, the fishing line is uniformly wound in the axial direction around the outer circumference of the spool.

Here, the rotational speed ratio of the pinion gear to the screw shaft is set at 1.5 or greater. As a result, the rotational speed of the screw shaft is slower than in a conventional device, so that the spool performs a reciprocating motion at a relatively slow speed. Accordingly, the fishing line is wound more densely around the outer circumference of the spool, so that the fishing line can be efficiently wound. Furthermore, since there is no need to increase the helix angle of the grooves in the screw shaft, there is no increase in the number of intersections of the grooves. Deterioration in the feeling experienced during the rotation of the handle can thus be avoided.

According to a preferred embodiment of the present invention, the reciprocation mechanism is further equipped with guide shafts which are disposed along the aforementioned spool shaft, and which are used to guide the reciprocating motion of the slider. The slider has a facing portion which faces only a portion of the outer circumference of the screw shaft. Accordingly, the slider can be caused to perform a smooth reciprocating motion. Thus, the slider need not be formed in a shape which covers the entire outer circumference of the screw shaft. As a result, the slider and the reel main body which covers the outer circumference of the slider can be reduced in size.

According to another preferred embodiment of the present invention, the reciprocation mechanism is further equipped with a driving gear which is fastened to the handle and which engages with the pinion gear, and an intermediate gear which is fastened to the screw shaft and which engages with the pinion gear. In this embodiment, the rotation of the handle is transmitted to the pinion gear via a driving gear which is fastened to the handle, and is then further transmitted to the screw shaft via an intermediate gear which engages with the pinion gear. In this case, the rotational speed ratio of the aforementioned pinion gear to the screw shaft is set at 1.5 or greater without using a complicated structure such as a planetary gear, etc. Accordingly, the structure of the mechanism is simplified.

According to still another preferred embodiment, the rotational speed ratio of the aforementioned pinion gear to the screw shaft is in the range of 1.8 to 2.5. Accordingly, the fishing line can be efficiently wound without increasing the size of the mechanism.

In accordance with a further preferred embodiment, the lead angle of the helical grooves formed in the screw shaft is 20° to 45°. A reduction of the thickness of the portions of the screw shaft located between the grooves can thereby be prevented, and an increase in the number of intersections of the grooves can also be prevented. Meanwhile, since the angle does not exceed 45°, there is no drop in the efficiency of conversion from rotation to linear motion.

According to another aspect of the invention, there is provided an improved spinning reel. The spinning reel is equipped with a reel main body on which a handle is mounted so that said handle is free to rotate, a rotor which has a line guide and which is caused to rotate by the handle, a spool shaft which is supported so that said spool shaft is free to perform a reciprocation motion in the axial direction with respect to the reel main body, a spool which is fastened to the spool shaft and around whose outer circumference a fishing line is guided by the line guide, and a reciprocation mechanism which is used to cause the spool shaft to perform a reciprocating motion. The reciprocation mechanism has a screw shaft, a pinion gear and a slider. The screw shaft is a freely rotatable shaft which is disposed along the spool shaft, and which has helical grooves formed in its outer circumference. The pinion gear is linked to the rotor and is provided for the purpose of transmitting the rotational force of the aforementioned handle to the screw shaft. This pinion gear has a rotational speed ratio of 1.5 or greater relative to the screw shaft. The slider has an engaging part that engages with the helical grooves. The slider is fastened to the spool shaft, and is caused to perform a reciprocating motion together with the spool shaft by the rotation of the screw shaft.

According to a preferred embodiment, the inventive spinning reel further includes a drag mechanism for exerting drag on the spool, either directly or via the spool shaft.

Other objects, features and advantages of the present invention Will become apparent to those skilled in the art from the following detailed description. It is to be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

The invention may be more readily understood by referring to the accompanying drawings in which.

DETAILED DESCRIPTION OF THE PREFERRED EMBODIMENTS

Figure 1:
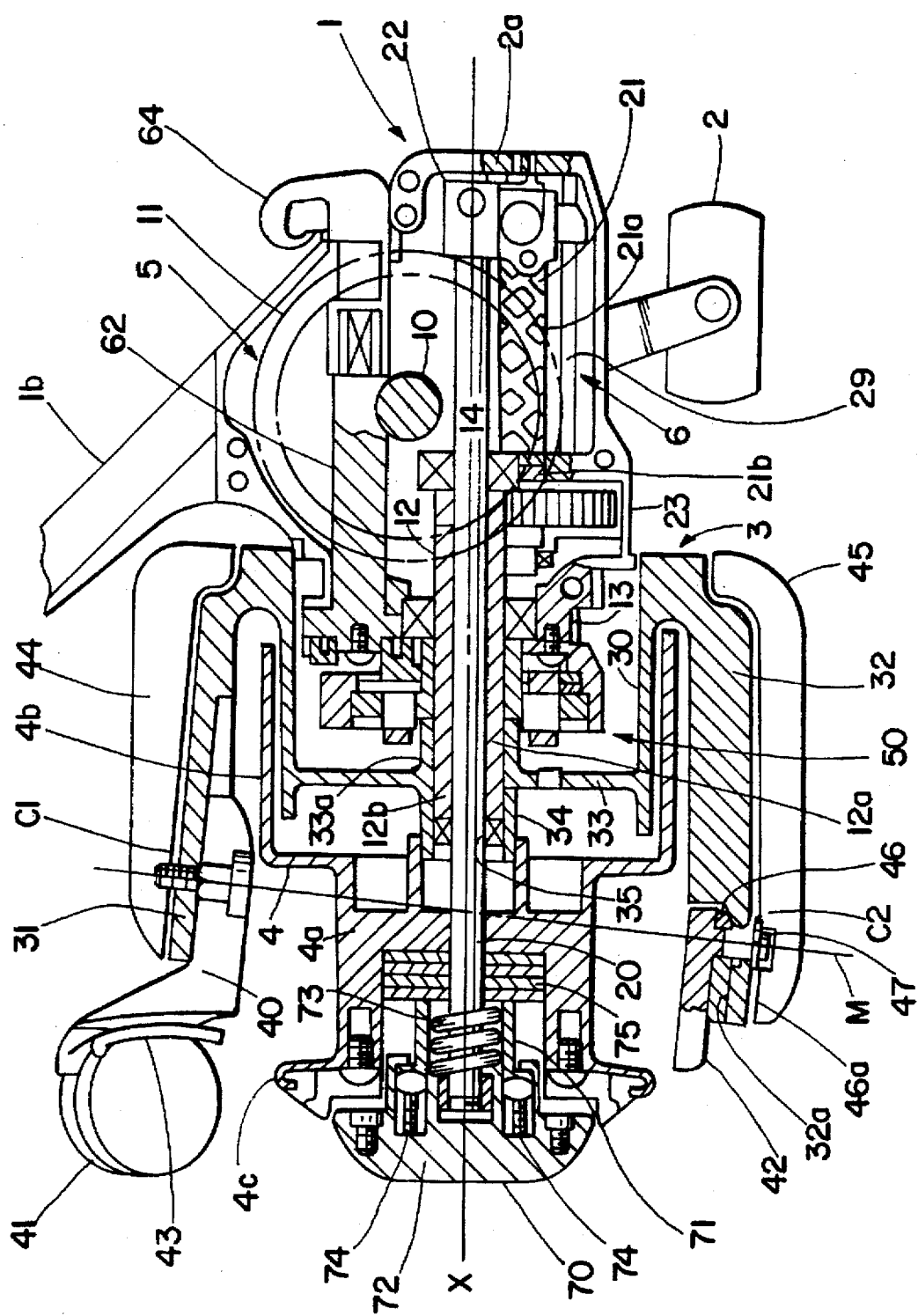
FIG. 1 is a sectional side view of a spinning reel constituting one embodiment of the present invention.
Figure 2:
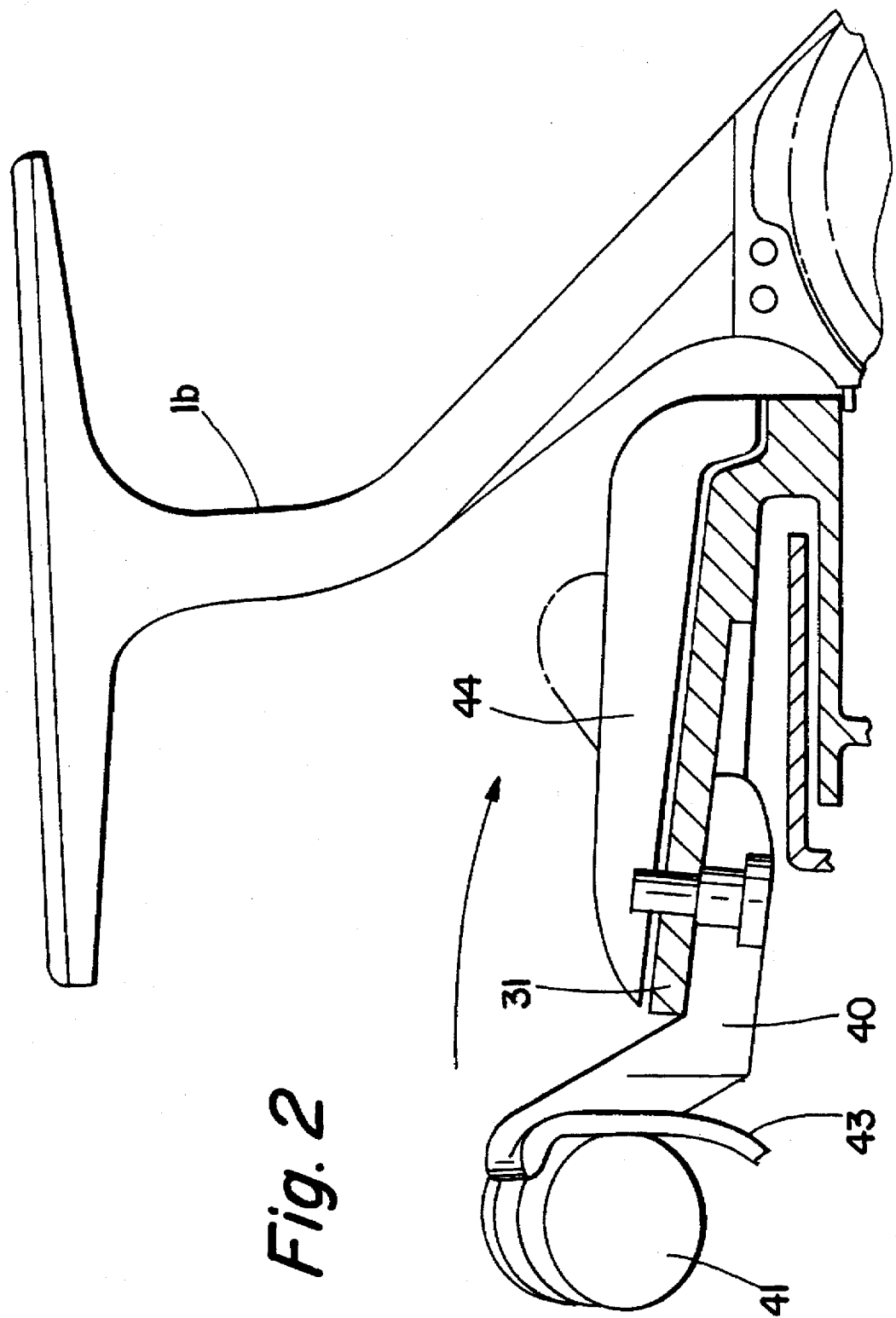
FIG. 2 illustrates the fishing rod attachment portion of the aforementioned spinning reel.
Figure 3:
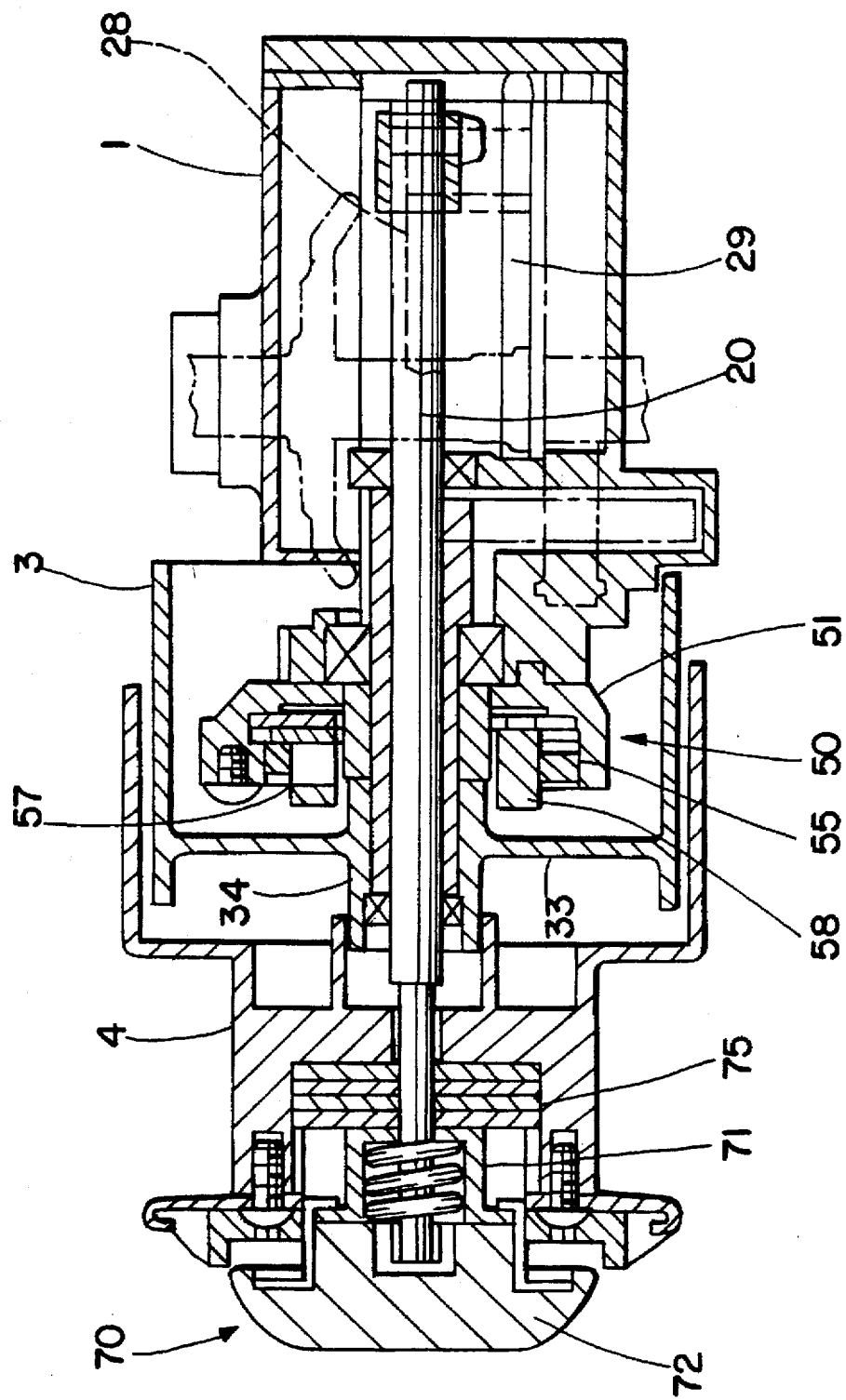
FIG. 3 is a sectional plan view of the aforementioned spinning reel.

The spinning reel shown in FIGS. 1 through 3, which constitutes one embodiment of the present invention, is equipped with a reel main body 1 which has a handle 2, a rotor 3 which is supported on the front portion of the reel main body 1 so that said rotor 3 is free to rotate, and a spool 4 which is installed on the front portion of the rotor 3, and which takes up the fishing line.

The reel main body 1 has a body 1a, and an attachment part 1b which is used to attach the spinning reel to the fishing rod is formed on the upper portion of body 1a. A rotor driving mechanism 5 which is used to cause rotation of the rotor 3, and a level winding mechanism 6 which is used to wind the fishing line uniformly on the spool 4 by causing the spool 4 to move backward and forward along the axis of rotation X, are installed inside the body 1a.

The rotor driving mechanism 5 has a driving gear 11 which rotates together with a shaft 10 to which the handle 2 is fastened, and a pinion gear 12 which engages with said driving gear 11. The pinion gear 12 is formed in the shape of a cylinder; the front portion 12a of pinion gear 12 extends toward the spool 4 through the central portion of the rotor 3. Furthermore, a screw part 12b is formed on the tip end of pinion gear 12. The intermediate portion and rear end portion of the pinion gear 12 are supported on the real main body 1 via respective bearings 13 and 14 so that the pinion gear 12 is free to rotate.

The level winding mechanism 6 is a mechanism which is used to cause a spool shaft 20 fastened to the central portion of the spool 4 to move back and forth in the axial direction, thus causing the spool 4 to move in the same direction. This level winding mechanism 6 has a screw shaft 21 which is installed beneath the spool shaft 20, a slider 22 which moves back and forth along the screw shaft 21, and an intermediate gear 23 which is fastened to the tip end 21b of the screw shaft 21. The screw shaft 21 is installed parallel to the spool shaft 20, and is supported on the body unit 1a so that screw shaft 21 is free to rotate. Furthermore, helical grooves 21a are formed in the outer circumferential portion of the screw shaft 21. The lead angle θ of these grooves 21a is set in the range of 20° to 45°. Furthermore, the lead angle θ of the aforementioned grooves 21a is an angle which can be expressed by the following equation (where D is the bottom diameter of the grooves 21a, and L is the length by which slider 22 advances along the screw shaft 21 in the axial direction in one revolution of screw shaft 21, i.e., the lead):

$$\text{lead angle } \theta = \text{arc cot } (pD/L)$$

In cases where this lead angle is less than 20°, the thickness of the portions of the screw shaft located between the grooves is reduced, and the number of intersections of the grooves is increased; accordingly, such a small angle is undesirable.

The rear end of the spool shaft 20 is fastened to the slider 22. Furthermore, the intermediate gear 23 engages with the pinion gear 12.

Here, the respective numbers of teeth of the pinion gear 12 and intermediate gear 23 are set so that the rotational speed ratio of the pinion gear 12 to the screw shaft 21 is 1.5 or greater (preferably 1.8 to 2.5). In cases where the aforementioned rotational speed ratio is less than 1.5, no improvement in the efficiency of fishing line take-up can be achieved. Meanwhile, in cases where the aforementioned rotational speed ratio is 1.8 or greater, a conspicuous improvement in efficiency is obtained. On the other hand, if said ratio exceeds 2.5, the diameter of the intermediate gear 23 becomes excessively large, so that it becomes difficult to reduce the size of the reel main body 1.

Figure 4:
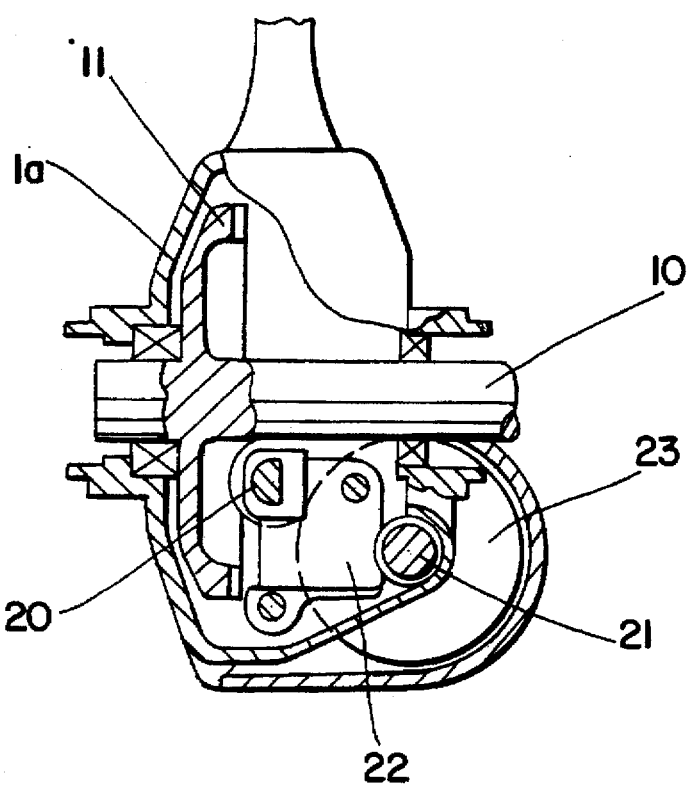
FIG. 4 is a sectional back view of the aforementioned spinning reel.
Figure 5:
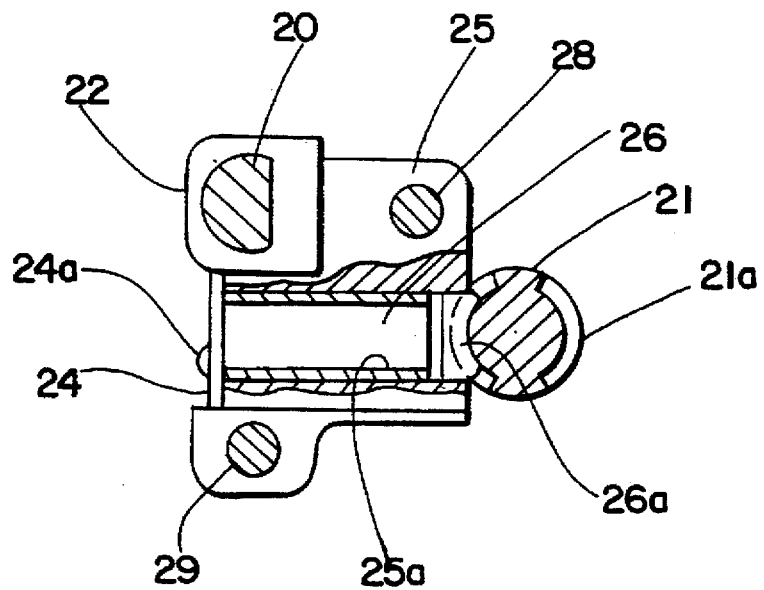
FIG. 5 is a partially sectional structural diagram of an embodiment of the slider.

As is shown in FIGS. 4 and 5, the slider 22 has a slider main body 25 and an engaging member 26 which is accommodated inside slider main body 25.

The slider main body 25 is mounted on two guide shafts 28 and 29 which are installed parallel to the spool shaft 20, so that slider main body 25 is free to slide on guide shafts 28 and 29. Since the slider main body 25 is guided by these two guide shafts 28 and 29, inclination of the slider main body 25 during sliding is prevented. Accordingly, there is no need to form the slider main body 25 so that slider main body 25 covers the entire circumference of screw shaft 21 as in the case of conventional slider main bodies. Hence, the slider main body 25 in the present embodiment has a shape which is such that slider main body 25 faces only one side surface of the screw shaft 21. Thus, the amount of projection of the slider main body 25 toward the other side surface of the screw shaft 21 is reduced. As a result, the size of the reel main body can be reduced.

Furthermore, a laterally oriented hole 25a is formed in the slider main body 25 so that said hole 25a is perpendicular to the screw shaft 21. The aforementioned engaging member 26 is inserted into this hole 25a so that said engaging member 26 is free to slide. An engaging element 26a which engages with the grooves 21a of the screw shaft 21 is formed on the tip end of the engaging member 26. A covering member 24 is fastened to one end of the hole 25a in the slider main body 25 by screw 24a.

The rotor 3 has a cylindrical element 30, as well as a first arm 31 and second arm 32 which are installed facing each other on the sides of the cylindrical element 30. The cylindrical element 30 and the arms 31 and 32 are formed as an integral unit. In the alternative, the cylindrical element 30 and the arms 31 and 32 can be formed as separate elements. Arms 31 and 32 can then be affixed to cylindrical element 30.

A front wall 33 is formed on the front portion of the cylindrical element 30, and a boss 33a is formed in the central portion of front wall 33. A through-hole is formed in the central portion of boss 33a, and the spool shaft 20 and front portion 12a of the pinion gear 12 pass through this through-hole. A nut 34 is installed on the front side of the front wall 33; this nut 34 is screwed onto the tip-end screw part 12b of the pinion gear 12. A bearing 35 which supports the spool shaft 20 so that shaft 20 is free to rotate is installed on the inside circumference of the nut 34.

A first bail supporting member 40 is attached to the inner circumferential side of the tip of the first arm 31 so that said first bail supporting member 40 is free to pivot. A line roller 41 which is used to guide the fishing line onto the spool 4 is mounted on the tip of first bail supporting member 40. Furthermore, a second bail supporting member 42 is mounted on the inner circumferential side of the tip of the second arm 32 so that said second bail supporting member 42 is free to pivot. This second bail supporting member 42 can also be caused to function as a balancer which eliminates any imbalance that might be caused during rotation caused by the first bail supporting member 40 and line roller 41. For example, this second bail supporting member 42 can be constructed from a material which has a larger specific gravity than the other parts. A bail 43 is installed between the line roller 41 on the tip of the first bail supporting member 40 and the second bail supporting member 42. Thus, since the first bail supporting member 40 is mounted on the inner circumferential side of the first arm 31, the radius of rotation of the first bail supporting member 40 is reduced, so that there is less likelihood that bail supporting member 40 will contact the hand that holds the fishing rod. Accordingly, the spool and the fishing rod can be installed closer together, so that an overall size reduction is possible. Furthermore, for the same reason, the radius of rotation is reduced so that any imbalance during rotation can be suppressed more easily.

Furthermore, optional covers 44 and 45 are attached to the outer circumferential sides of the respective arms 31 and 32. The surfaces of these covers 44 and 45 have smooth continuous shapes in the longitudinal direction and circumferential direction. As a result, catching of the fishing line can be prevented.

Here, both bail supporting members 40 and 42 are free to pivot about a single pivoting axis M. If the point where the pivoting axis M intersects with the first bail supporting member attachment surface of first arm 31 is taken as the pivoting center C1, and the point where the pivoting axis M intersects with the second bail supporting member attachment surface of second arm 32 is taken as the pivoting center C2, the pivoting center C2 is positioned further forward than the pivoting center C1. In other words, the pivoting axis M is inclined with respect to the axis of rotation X. Furthermore, the bail supporting members 40 and 42 are installed so that the pivoting planes of members 40 and 42 are perpendicular to the pivoting axis M.

Figure 6:
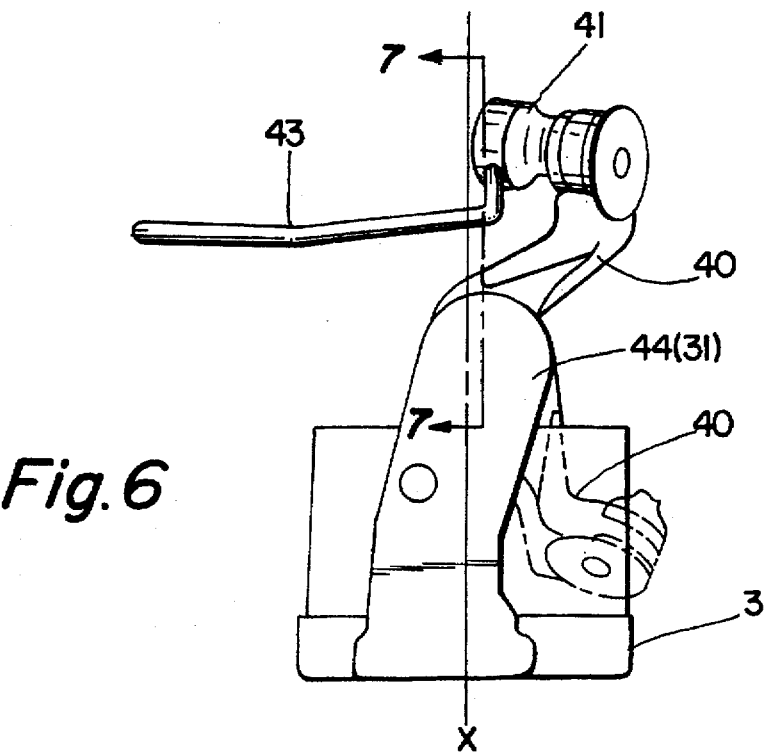
FIG. 6 is a view of one side of the rotor.
Figure 7:
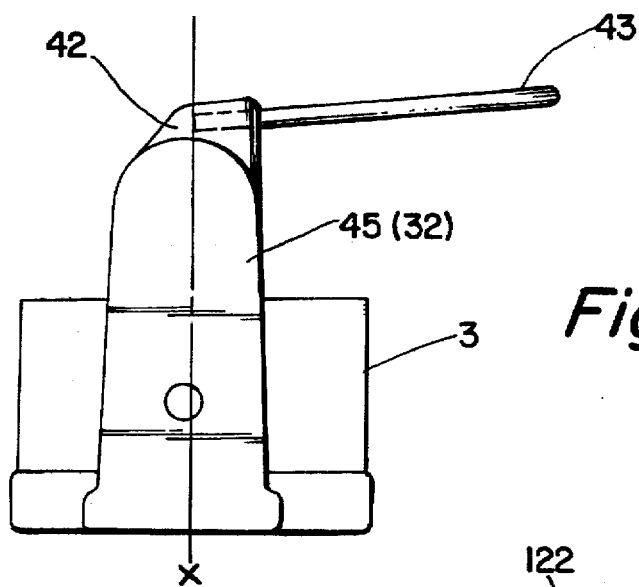
FIG. 7 is a view of the other side of the rotor.

Furthermore, as is shown in FIGS. 6 and 7, the rear portion of the first arm 31 (on the reel main body side) is offset from the axis of rotation X toward the side of the bail in the line retrieving position. Furthermore, first arm 31 is inclined in the opposite direction (i.e., toward the side of the bail in the line releasing position) from the central portion of arm 31 forward, in the axial direction. As a result of the rear portion of the first arm 31 being offset toward the side of the bail in the line retrieving position, interference between the bail 43 and the first arm 31 when the bail 43 is thrown over into the line releasing position (as indicated by the one-dot chain line in FIG. 6) is reduced. Furthermore, any imbalance during rotation caused by the first bail supporting member 40 or the line roller, etc., can be suppressed. Meanwhile, as is shown in FIG. 7, the second arm 32 extends in more or less a straight line overall. In addition, the pivoting centers of the first and second bail supporting members 40 and 42 are offset from the axis of rotation X toward the side of the bail in the line releasing position by a distance D. As a result, any imbalance during rotation that might be caused by the bail 43 is suppressed.

Here, the attachment portion of the second bail supporting member 42 will be described in detail.

The second bail supporting member attachment surface 32a of the second arm 32 opens outward with respect to the axis of rotation X. A spacer 46, preferably made of a synthetic resin, is installed between the second bail supporting member 42 and the inside surface 32a of the tip end of the second arm 32. A collar 46a is formed on one end of the spacer 46 as an integral part of said spacer 46. This collar part 46a supports the pivoting shaft portion of the second bail supporting member 42. An E-shaped retaining ring 47 which is used to prevent slipping out is mounted on the tip end of the pivoting shaft portion of the second bail supporting member 42. Since synthetic resin spacer 46 is provided and the inside surface 32a of the tip end of the second arm 32 is formed so that it opens outward, the molding process that is used to form the rotor 3 is facilitated. Furthermore, since the pivoting shaft of the second bail supporting member 42 is supported by synthetic resin collar 46a, vibration is absorbed and attenuated by said collar 46a. This effect is especially conspicuous in cases where the rotor is made of aluminum.

The spool 4 is installed between the first arm 31 and second arm 32 of the rotor 3, and is mounted on the tip end of the spool shaft 20 via a drag mechanism 70. The spool 4 has a line winding barrel 4a around which the fishing line is wound, a skirt 4b which is formed on the rear end of the line winding barrel 4a as an integral part of said line winding barrel 4a, and a flange plate 4c which is fastened to the front end of the line winding barrel 4a. The flange plate 4c preferably is formed from a stainless steel plate, and is mounted on the line winding barrel 4a by fastening means such as screws. In this case, the flange plate 4c is slightly bent, and the spring force created by this bending is utilized in order to insure that no gap is formed between the front end of the line winding barrel 4a and the flange plate 4c when the flange plate 4c is attached. As a result, the fishing line cannot enter the area between the line winding barrel 4a and the flange plate 4c.

The drag mechanism 70 has a pressing member 71 which is pressed against the inside front end surface of the spool 4, an adjustment knob 72 which is used to adjust the drag force, pushing springs 73 and 74 which are installed between the pressing member 71 and the adjustment knob 72, and a plurality of clutch plates 75 which are installed between the pressing member 71 and the spool 4. In this construction, the pressing force of the pressing member 71 against the spool 4 can be adjusted by adjusting the amount of tightening of the adjustment knob 72. Accordingly, the drag force is adjustable.

During casting, the bail 43 is thrown over into the line releasing position. As a result, the first and second bail supporting members 40 and 42 rotate in the same direction about the pivoting axis M. In this case, since the first bail supporting member 40 is installed on the inner circumferential side of the first arm 31, and the pivoting axis M is inclined with respect to the axis of rotation X as shown in FIG. 1, the first bail supporting member 40 and the line roller 41 installed on the tip of first bail supporting member 40 move further inward from their positions in the case of the line retrieving position. As a result, the fishing line paid out during casting is less likely to become entangled with the first bail supporting member 40 or line roller 41. Furthermore, although the pivoting axis M is inclined with respect to the axis of rotation X, both bail supporting members 40 and 42 rotate about the same pivoting axis M, and the respective planes of rotation of said bail supporting members 40 and 42 are perpendicular to pivoting axis M. Accordingly, the bail 43 can be operated smoothly without any entanglement.

During take-up of the fishing line, the bail 43 is pushed over into the line retrieving position. When the handle 2 is rotated in this state, the resulting rotational force is transmitted to the pinion gear 12 via the handle shaft and the driving gear 11. The rotational force transmitted to this pinion gear 12 is then transmitted to the rotor 3 via the front portion 12a of the pinion gear 12.

Meanwhile, the screw shaft 21 is caused to rotate by the intermediate gear 23 which engages with the pinion gear 12, so that the slider 22 which engages with the grooves 21a of the screw shaft 21 moves back and forth while being guided by the guide shafts 28 and 29. As a result, the spool shaft 20 and spool 4 perform a reciprocating motion back and forth along the axis of rotation X, so that the fishing line which is guided onto the spool 4 by the bail 43 and line roller 41 is uniformly wound around the outer circumference of the spool 4 in the longitudinal direction.

Here, since the rotational speed ratio of the pinion gear 12 to the screw shaft 21 is set at 1.5 or greater, the speed of movement of the spool 4 can be reduced compared to that in a conventional device. Accordingly, the efficiency of fishing line take-up can be improved. Furthermore, a larger quantity of fishing line can be wound.

Since the slider 22 performs a reciprocating motion while being guided by the guide shafts 28 and 29, said reciprocating motion can also be performed smoothly without any rotation or tilting of the slider 22. Accordingly, it is not necessary for the slider main body 25 to cover the entire circumference of the screw shaft 21. As a result, the space on the opposite side from the engaging member 26 can be reduced. Accordingly, protrusion in the lateral direction can be reduced in the rear portion of the reel main body 2.

During rotation of the rotor 3, a rotational imbalance tends to occur which is caused by members such as the bail 43, etc. In the present embodiment, therefore, in order to eliminate any imbalance that might be caused by the bail supporting members 40 and 42, line roller 41 or bail 43, the rear end portions of both arms 31 and 32 are offset toward the side of the bail in the line retrieving position. The bail supporting members 40 and 42 are installed so that the pivoting axis of said bail supporting members is offset toward the side of the bail in the line release attitude with respect to the axis of rotation X. Furthermore, any imbalance that might arise from the line roller 41 is suppressed by installing the second bail supporting member 42 further forward than the first bail supporting member 40. Furthermore, by constructing this second bail supporting member from a heavy substance which has a higher specific gravity than the other parts, it would also be possible to cause said second bail supporting member to function as a balancer.

Figure 8:
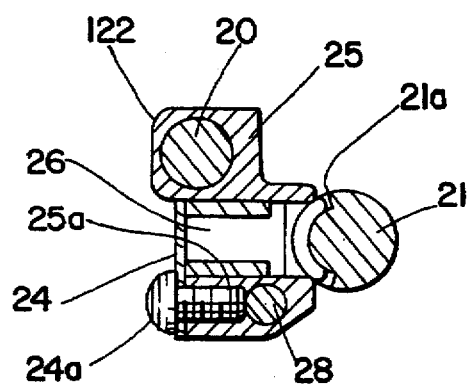
FIG. 8 is a partially sectional structural diagram of another embodiment of the slider.

An alternative embodiment of the slider according to the invention is illustrated in FIG. 8. As with the slider 22 of FIG. 5, slider 122 has a slider main body 25 and an engaging member 26 which is accommodated inside slider main body 25. Slider main body 25 here is mounted on a single guide shaft 28 which is installed parallel to the spool shaft 20, so that slider main body 25 is free to slide on guide shaft 28. Laterally oriented hole 25a is formed in the slider main body 25 and engaging member 26 is inserted into this hole 25a as in the embodiment of FIG. 5. Engaging element 26a on the tip of engaging member 26 engages with the grooves 21a of the screw shaft 21. Covering member 24 is fastened to one end of the hole 25a in the slider main body 25 by screw 24a.

Figure 9A:
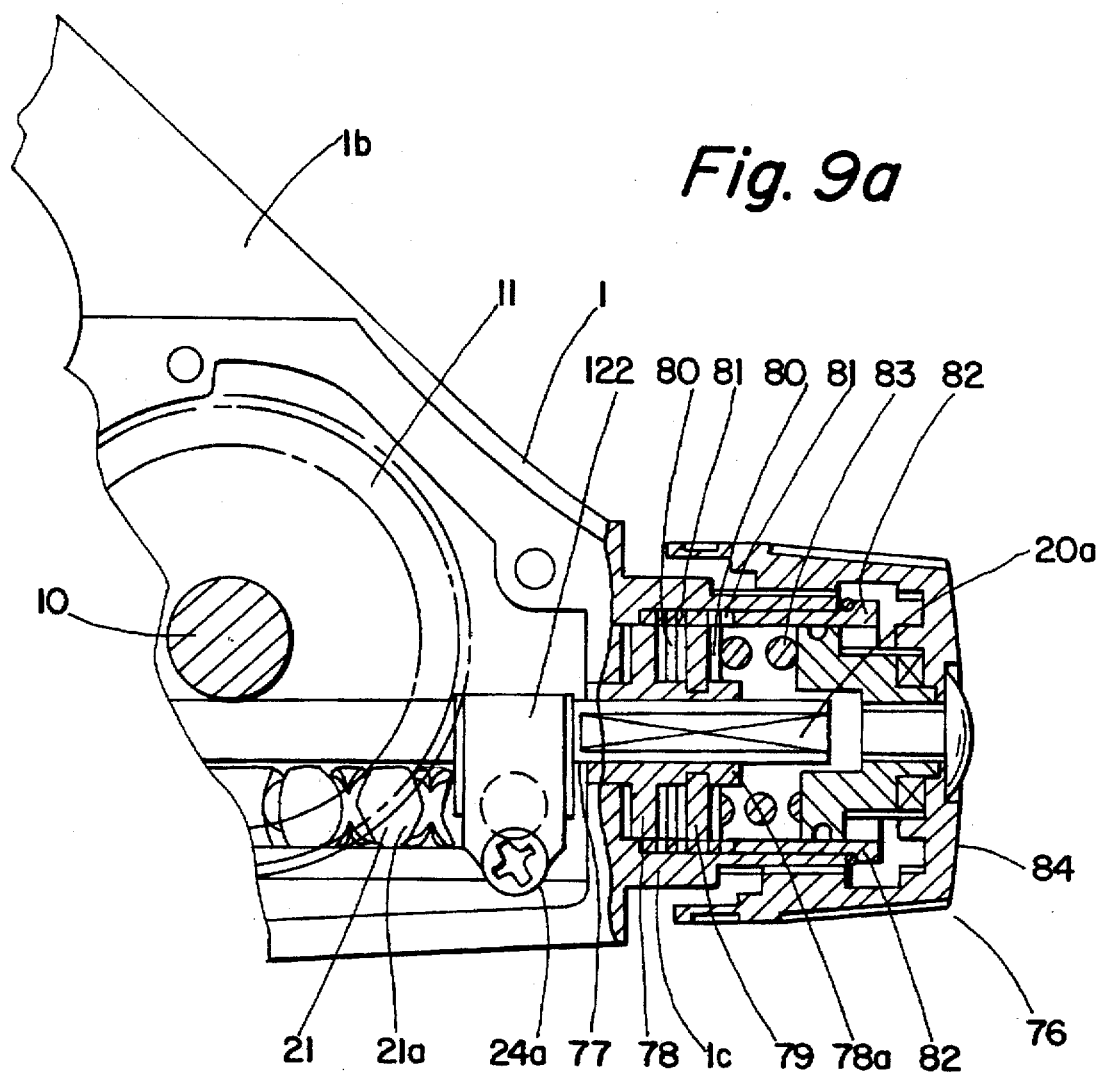
FIGS. 9a–b are a sectional side view and sectional rear view, respectively, of another embodiment of the present invention which includes a rear drag mechanism together with the slider embodiment of FIG. 8.
Figure 9B:
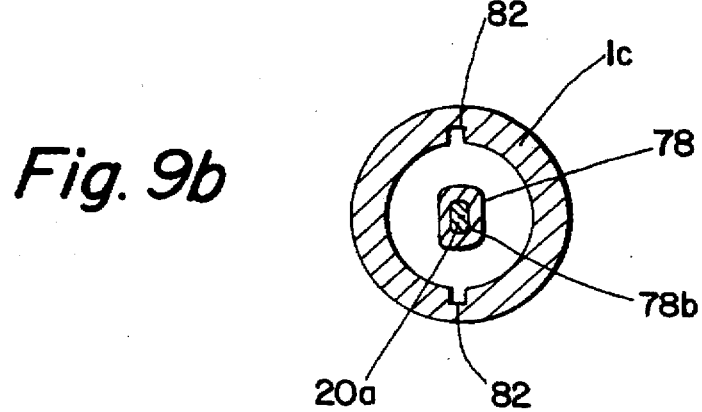

Slider 122 is employed in an alternative embodiment of a spinning reel of the invention which further includes a rear drag mechanism 76 in place of, or in addition to, the drag mechanism 70 shown in FIG. 1. As shown in FIGS. 9a–b, reel body 1 includes a substantially cylindrical rear extension 1c. Spool shaft 20 includes rear oblong extension 20a which extends into rear extension 1c through oblong hole 77. Rear drag bush 78 having oblong section 78a and oblong hole 78b rotates with spool shaft 20 and oblong extension 20a, and spool shaft 20 reciprocates through hole 77.

Oblong section 78a extends through key washer 79, which rotates with rear drag bush 78. Eared washers 80 having ears 81 engage with key groove 82 within rear extension 1c. Eared washers 80 thus do not rotate together with spool 20.

Pushing spring 83 is installed between eared washers 80 and rear knob 84. Adjusting the tighening of rear knob 84 allows adjustment of the drag force between spool shaft 20 and rear extension 1c of reel body 1.

What is claimed is:

1. A spinning reel reciprocation mechanism comprising:
   (a) a rotatable screw shaft which has an outer circumference in which a plurality of helical grooves are formed;
   (b) an intermediate gear which comprises a plurality of teeth and which is affixed to said screw shaft;
   (c) a pinion gear which comprises a plurality of teeth and which engages with said intermediate gear, wherein the numbers of said teeth of said intermediate gear and said teeth of said pinion gear are related such that said pinion gear has a rotational speed ratio of at least 1.5 relative to said screw shaft; and
   (d) a slider which has an engaging member that engages with said helical grooves, wherein said slider performs reciprocating motion in response to rotation of said screw shaft.

2. A spinning reel reciprocation mechanism as defined in claim 1, further comprising a guide shaft which guides the reciprocating motion of said slider, wherein said slider faces only a portion of said outer circumference of said screw shaft.

3. A spinning reel reciprocation mechanism as defined in claim 2, comprising two guide shafts.

4. A spinning reel reciprocation mechanism as defined in claim 1, in which the rotational speed ratio of said pinion gear to said screw shaft is in the range of 1.8 to 2.5.

5. A spinning reel reciprocation mechanism as defined in claim 1 in which said helical grooves formed in said screw shaft have a lead angle from 20° to 45°.

6. A spinning reel comprising
   (i) a reel main body on which a handle is mounted so that said handle is free to rotate,
   (ii) a driving gear to which said handle is connected,
   (iii) a rotor which has a line roller,
   (iv) a spool shaft which is supported so that said spool shaft is free to move in the axial direction with respect to said reel main body,
   (v) a spool which is affixed to said spool shaft and which has an outer circumference around which a fishing line can be guided by said line roller, and
   (vi) a spinning reel reciprocation mechanism comprising
      (a) a rotatable screw shaft which has an outer circumference in which a plurality of helical grooves are formed,
      (b) an intermediate gear which comprises a plurality of teeth and which is affixed to said screw shaft;
      (c) a pinion gear which comprises a plurality of teeth, engages with said intermediate gear, and has a front portion which is affixed to said rotor, wherein the numbers of said teeth of said intermediate gear and said teeth of said pinion gear are related such that said pinion gear has a rotational speed ratio of at least 1.5 relative to said screw shaft, and
      (d) a slider which has an engaging member that engages with said helical grooves, wherein said slider performs reciprocating motion in response to rotation of said screw shaft,
   wherein said screw shaft of said spinning reel oscillation mechanism is disposed along said spool shaft, and wherein said spool shaft is affixed to said slider of said spinning reel oscillation mechanism and performs a reciprocating motion together with said slider.

7. A spinning reel as defined in claim 6 further comprising a drag mechanism for adjusting the drag force exerted by said spool on said fishing line.

8. A spinning reel as defined in claim 7 wherein said spool is affixed to said spool shaft by said drag mechanism.

9. A spinning reel as defined in claim 8 wherein said spool has an inside front surface, and wherein said drag mechanism comprises a pressing member disposed adjacent said inside front end surface of said spool, an adjustment knob, a plurality of pushing springs disposed between said pressing member and said adjustment knob, and a plurality of clutch plates disposed between said pressing member and said spool.

10. A spinning reel as defined in claim 7 wherein said reel main body includes a rear extension on which said drag mechanism is mounted.

11. A spinning reel as defined in claim 10 wherein said spool shaft comprises an extension which extends into said rear extension of said main body, said rear extension of said main body has defined therein a key groove, and said drag mechanism comprises a rear drag bush that rotates together with said spool shaft and through which said spool shaft reciprocates, a key washer which rotates together with said rear drag bush, a plurality of eared washers having ears which engage with said key groove of said rear extension of said main body, a rear knob, and a pushing spring disposed between said rear knob and said plurality of eared washers.

* * * * *